United States Patent [19]

Karolek et al.

[11] Patent Number: 5,031,712
[45] Date of Patent: Jul. 16, 1991

[54] METHOD AND APPARATUS FOR THERMAL CONTROL OF AUTOMOTIVE COMPONENTS

[75] Inventors: Neil C. Karolek, Cudahy; Mark S. Inkmann, Milwaukee; Richard T. Johnson, Hubertus; Jerome A. Kondrakiewicz; Brett M. Lenhardt, both of Milwaukee; David W. Saari, South Milwaukee, all of Wis.

[73] Assignee: Globe-Union, Inc., Milwaukee, Wis.

[21] Appl. No.: 405,689

[22] Filed: Sep. 7, 1989

[51] Int. Cl.$^5$ .................. B60K 11/00; B60R 16/04
[52] U.S. Cl. .................................. 180/68.2; 180/68.5
[58] Field of Search ............... 180/68.1, 68.2, 68.4, 180/68.3, 68.6, 68.5; 296/37.1

[56] References Cited

U.S. PATENT DOCUMENTS

| | | | |
|---|---|---|---|
| 2,104,773 | 1/1938 | Saunders | 180/68.5 |
| 3,961,605 | 6/1976 | Kaltner | 180/68.1 |
| 3,977,490 | 8/1976 | Flaig | 180/68.5 |
| 4,598,786 | 7/1986 | Kirchweger | 180/68.1 |
| 4,854,540 | 8/1989 | Balek | 180/68.5 |

Primary Examiner—Andres Kashnikow
Assistant Examiner—Richard Camby
Attorney, Agent, or Firm—Foley & Lardner

[57] ABSTRACT

A battery thermal control system including a casing for the battery and a cover for enclosing the battery in the casing, the casing being provided with a number of ribs for supporting the battery in a spaced relation to the bottom of the casing and to the side walls of the casing, a fan connected to discharge air into the casing for circulation through the spaces between the battery and the casing and a bypass duct for connecting the fan to a warm air source for heating the battery in the winter. A timer circuit is provided for continuing the operation of the fan after the engine is turned off. The timing circuit including a temperature switch for activating the timer circuit when the temperature is above a preset minimum.

6 Claims, 3 Drawing Sheets

METHOD AND APPARATUS FOR THERMAL CONTROL OF AUTOMOTIVE COMPONENTS

BACKGROUND OF THE INVENTION

1. Field of the Invention

The present invention relates, generally, to methods and apparatus for increasing the useful life of temperature-sensitive automotive components by limiting the magnitude and duration of temperature extrema in the immediate component environment, and more particularly to a system for directing an air stream over the components during vehicle operation and for a predetermined period thereafter.

2. Related Application

This application is an improvement upon an earlier filed U.S. application Ser. No. 07/311.149 filed on Feb. 14, 1989, U.S. Pat. No. 4,976,327 issued Dec. 11, 1990 and entitled "A Battery Module for the Engine Compartment of an Automobile", commonly assigned herewith. The entire disclosure of Ser. No. 07/311,149 is hereby incorporated by reference.

DESCRIPTION OF THE PRIOR ART

The prevalence of electronic and other temperature-sensitive components in newer model vehicles continues to increase. The demand for on-board computers, electronic ignitions, antilock brake system modules, and electronic engine controls, for example, has changed the face of automotive design in recent years. At the same time, the desire to maximize operator and passenger comfort results in these components being placed under the hood (the "underhood" area as used herein), under the car, and in the trunk. The introduction of comprehensive warranties of longer duration dictates that these components be able to withstand the harsh temperature fluctuations associated with these environments.

During stop-and-go city driving or while the engine is idling with no wind, the underhood air temperature remains well above ambient, often exceeding 200 degrees F in the southwest summer and 100 degrees F in the northern winter. When the air speed, from the fore to the aft direction with respect to the car, exceeds 5 mph, the underhood air temperature follows the ambient air temperature fairly closely. Virtually any breeze, if directed toward the front of the car, forces the underhood air temperature toward ambient; a steady wind over 5 mph maintains the underhood air temperature near the ambient air temperature.

At high temperatures such as those encountered in a vehicle trunk or under the hood, the performance of various temperature-sensitive components is impaired. Many electrical and electronic devices, for example, may be irreparably damaged at very high temperatures. In addition, battery water loss due to evaporation and, in some instances, boiling of the water caused by excessive charge rate results in the battery grids being subjected to accelerated corrosion. Moreover, the material comprising the battery plates tends to crumble after extended exposure to elevated temperatures. At extremely low battery temperatures, on the other hand, the performance of various components, including the battery, may also be impaired. Thus, it is desirable to minimize the duration and extent of both high and low temperature extremes Although temperature-sensitive components, and particularly the battery, receive some radiant heat from the engine, most of the increase in component temperature is caused by the temperature of the underhood air around the component, i.e., convective heat. The effects of radiative heat can be limited by at least two factors: physical barriers placed between the engine and the battery; and, during winter driving, the cold underhood air may cool the engine surface and inhibit the release of radiative heat to the battery. Convective and conductive heat, on the other hand, are not as easily compensated for. Presently known techniques employ passive air flow, i.e., air flow attributable to either wind or vehicle movement This passive ram air is ducted from the outside of the car and directed at the component sought to be cooled. However, passive ram air is not exploitable when the engine is off absent a properly oriented wind.

SUMMARY OF THE INVENTION

The thermal control system of the present invention provides a low cost, energy efficient means for thermal control of various temperature-sensitive automotive components. In accordance with one embodiment of the invention, means are provided for detecting the temperature of the component and for detecting when the engine is on or off. A fan or similar device is provided for generating an air stream, which stream is ducted from the outside of the vehicle and directed toward the component during the time in which the engine is running and for a period (cycle) after engine shut down. In this context, it is understood that the terms "period" and "cycle" refer to one or both of either a preset duration, for example two hours, or a variable time between engine shut down and a predetermined event, for example detection of a threshold component temperature.

In accordance with a highly preferred embodiment of the present invention, a thermal control chamber (box) for housing a battery is provided with air flow passages under, over and around the outside of the battery, which passages are configured to satisfy certain desired flow criteria. These criteria are dependant on the function of the air stream, namely to produce either cooling or heating of the battery by passing air around the battery, which air is at a different temperature than the battery. Alternatively, air which is substantially the same temperature as the battery can be used to isolate the battery from the outside environment, for example by removing incoming heat.

The battery thermal control box in accordance with an aspect of the invention generally includes a casing having a series of air flow ribs on the bottom panel for supporting the battery in the casing. The ribs, in combination with the bottom of the battery, form channels for directing air blown into the casing by a fan into the spaces between the side walls and end walls of the casing. A cover is mounted on the top of the casing for directing the air across the top of the battery for discharge from the thermal control box. An electric circuit is provided for energizing the fan during vehicle operation when the ambient temperature reaches a predetermined temperature, and thereafter for a predetermined period of time after the engine is turned off. The battery may be cooled or heated when the engine is off by connecting the fan to either a cool air or hot air source.

One of the principal features of the invention is the ability to provide air flow around selected temperature sensitive components both when the engine is running and when the engine is turned off.

Another feature of the invention is the ability to continue to cool or heat components for a predetermined period of time after the engine is turned off in order to cool or heat the components and thereby maintain their useful life for a longer period of time.

Other features and advantages of the invention will become apparent to those skilled in the art upon review of the following description, claims and drawings.

Figure 1:
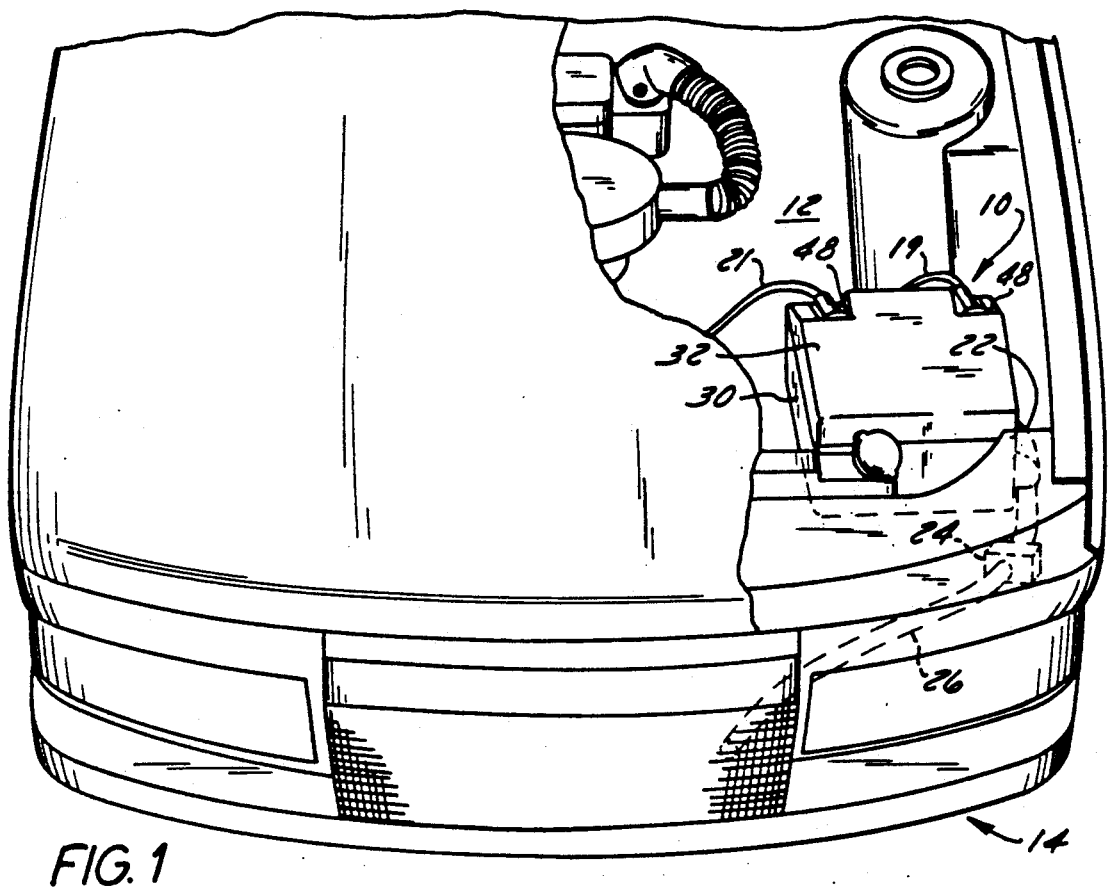
FIG. 1 is a perspective view of the front of an automobile showing the battery thermal control box positioned under the hood.
Figure 2:
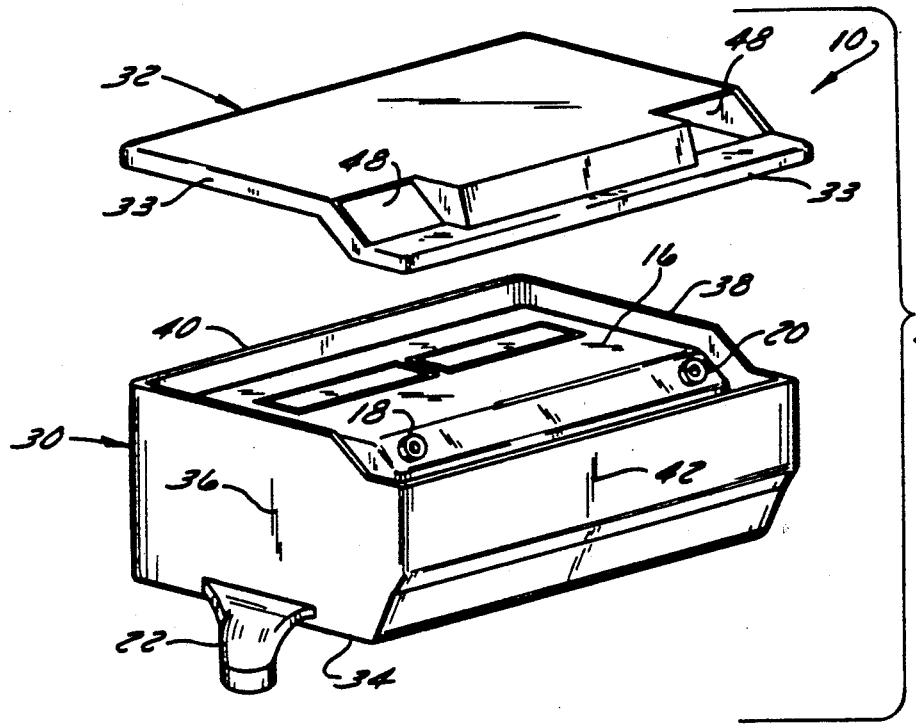
FIG. 2 is a perspective view showing the cover spaced from the top of the battery thermal control box.
Figure 3:
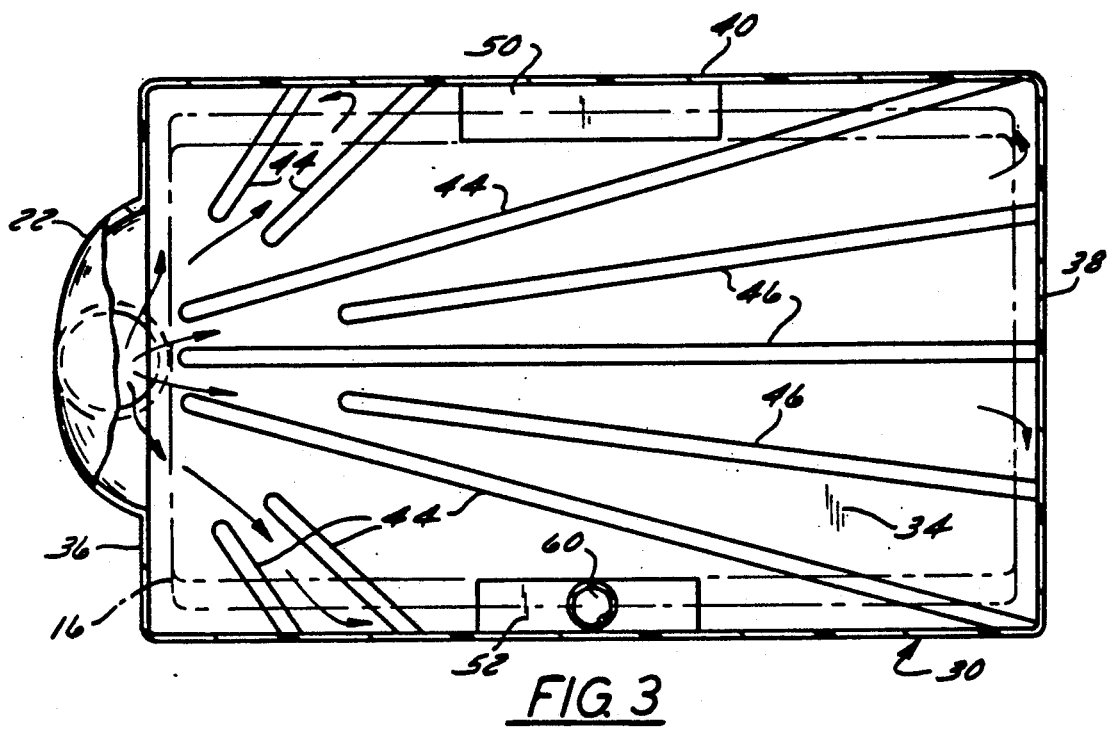
FIG. 3 is a view of the bottom of the battery thermal control box showing the pattern of the air flow ribs.
Figure 4:
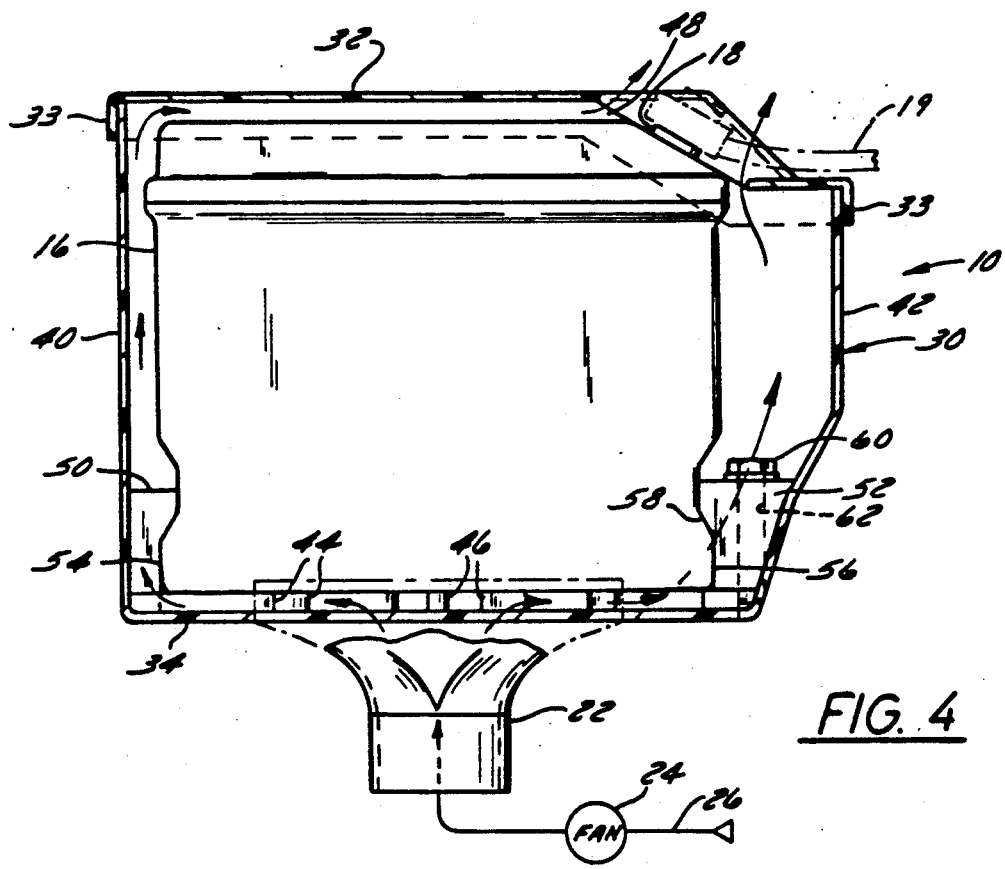
FIG. 4 is an end view of the battery thermal control box with the end removed to show the air flow path through the battery thermal control box.

Before describing one embodiment of the invention in detail, it is to be understood that the invention is not limited in its application to the details as set forth in the following description, or illustrated in the drawings. The invention is capable of other embodiments and of being practiced or carried out in various ways. Also, it is to be understood that the phraseology and terminology used herein are for the purpose of description and should not be regarded as limiting.

DETAILED DESCRIPTION OF PREFERRED EXEMPLARY EMBODIMENTS

For clarity and ease of illustration, the invention is described herein in the context of a vehicle battery, although it is understood that the invention applies to virtually any automotive component or plurality thereof, with respect to which it is desirable to maintain a narrow thermal envelope The present inventors have determined that battery temperature moves in the direction of the underhood temperature, reaching a peak just before the underhood temperature begins to drop below the battery temperature. This peak can occur as much as three hours after the engine is turned off, for example when the car is parked in a hot, windless environment. If a wind is directed at the front of the car the underhood air temperature will be somewhat lower than the windless condition and, in the presence of stronger winds may approach ambient air temperature. This latter condition, however, is not often present. Typically, a significant elevation in battery temperature is observed during the first few hours after the engine is turned off.

A contributing factor to the increase in underhood temperature is the closed facia design that is presently being used in modern automobiles. The reduced air space under the hood traps the air, resulting in a faster rise in air temperature as well as higher peak temperature. Although the radiator fan blows some ambient air through the radiator into the underhood area when operating, because of the limited volummetric flow rate, it is not as effective as wind flowing through the front of the car during driving.

It is well known that the useful life of many automotive components, and batteries in particular, is a function of temperature. The present inventors have determined that the critical time to protect the battery from excessive temperatures, for example 100 degrees F, is when there is no underhood air flow, i.e., windless idling, driving in city traffic, and parking. Thus, to the extent the average temperature of a component over time can be narrowly controlled, a corresponding increase in the useful life of the component may be observed.

Referring now to FIGS. 1-4, an exemplary battery thermal control box 10 in accordance with the present invention is mounted in the front of the engine compartment 12 of an automobile 14. A battery 16 is positioned in the battery box 10 and respective battery terminals 18 and 20 are connected to the engine by means of respective cables 19 and 21. Means are provided for circulating air through the battery thermal control box 10 to remove hot or cold air from the space around the battery. Suitable means may be in the form of a fan 24 which is connected to an air inlet 22 mounted on the side of the battery thermal control box and to an intake duct 26 connected to the front of the automobile.

Battery thermal control box 10 advantageously includes a case 30 and a cover 32. Case 30 is formed as an integral unit having a bottom panel 34, respective end walls 36, 38 and respective side walls 40, 42. Bottom panel 34 includes a plurality of ribs 44 for directing air to the side walls of the battery and a number of ribs 46 which direct air to the opposite end of the battery. Battery 16 is seated on ribs 44, 46 thereby forming channels between the ribs for directing air from intake duct 26, through battery case 30, for subsequent discharge through respective openings 48 provided in cover 32. It should be noted that the discharge openings are located in the vicinity of battery terminals 18 and 20 so that any hydrogen gas which may leak to the outside of the battery will be purged from the battery case. An alternate means of protecting against hydrogen gas build-up would be the use of a gas collection manifold on or within the battery with a single point outlet to which a venting hose or tube is attached which terminates outside the battery thermal control box. This embodiment would allow placement of the discharge opening or openings in any advantageous location.

Means are provided for securing the battery inside of the battery case 30. Suitable means include a block 50 formed on the inside of side wall 40 and a removable block 52 provided on the inside of side wall 42. It should be noted that battery 16 may include a ridge 54 along the back thereof and a ridge 56 along the front of the battery. The battery is placed in the case with ridge 54 in abutting engagement with block 50. Block 52 may then be seated in the case with a recess 58 aligned with ridge 56. Block 52 is suitably secured to the bottom of case 30 by a screw 60 which passes through an opening 62 in the block and is threadedly received in the base of the case. Once the battery is in place, cover 32 is placed on the top of case 30 such that an outer peripheral lip 33 of cover 32 overlies the outside edge of case 30. Terminal connections are made to the terminals on the battery through openings 48.

Figure 6:
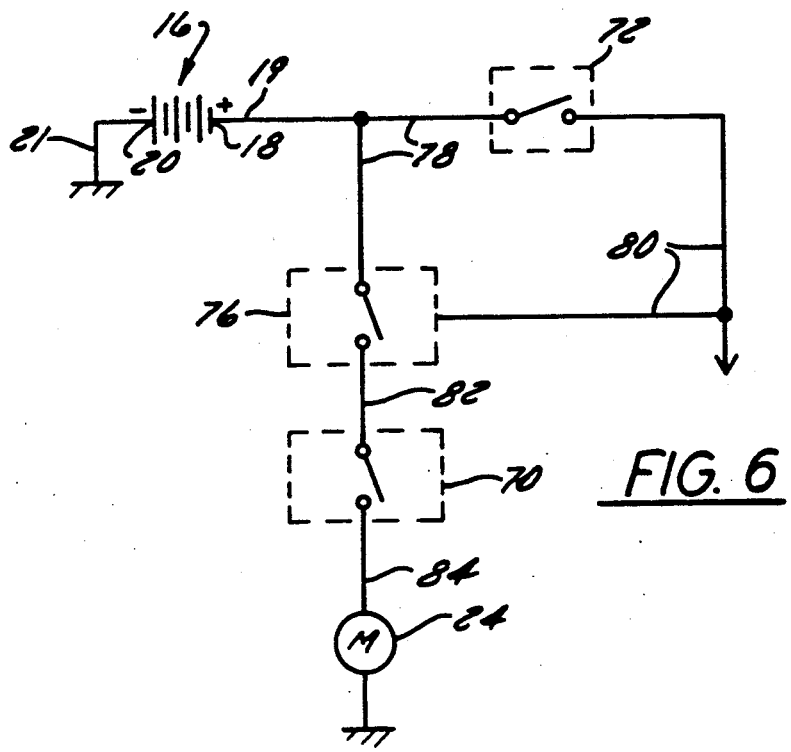
FIG. 6 is a circuit diagram of the electrical system for the battery thermal control box.
Figure 5:
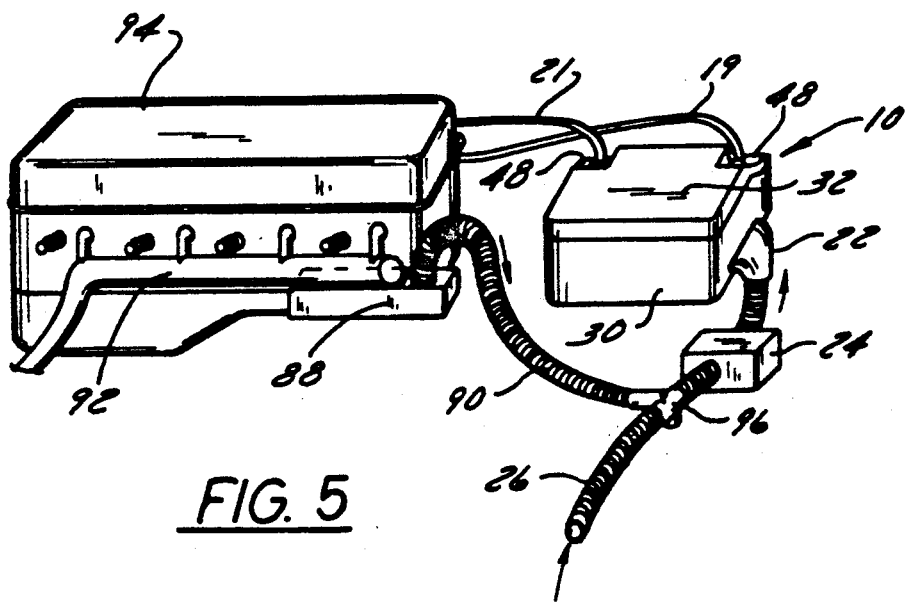
FIG. 5 is a view of a bypass system for providing warm air to the battery thermal control box in cold weather.

A fan motor 24 is advantageously controlled by an exemplary circuit shown schematically in FIG. 6. As shown therein, positive terminal 18 of battery 16 is connected to an ignition switch 72 and a timer switch 76 by a circuit 78. When ignition switch 72 is closed to enable the vehicle to operate, timer switch 72 is energized through a circuit 80. Timer switch 76 remains closed for a preset period of time ranging from fifteen (15) minutes to eight hours.

Timer switch 76 is connected to a temperature switch 70 by means of a circuit 82. Motor 24 is activated by temperature switch 70, which switch is closed (conducting) when the temperature in the vicinity of the switch is greater than or equal to a predetermined threshold temperature, for example, between approximately 45 and 80 degrees Fahrenheit, and preferably about 60 degrees Fahrenheit. Otherwise, switch 70 is open (nonconducting). Temperature switch 70 is connected through a circuit 84 to fan motor 24. When both temperature switch 70 and timer switch 76 are closed, fan motor 24 will circulate air to battery case 30.

When the engine is turned on, ignition switch 72 closes the circuit through timer switch 76 and temperature switch 70, thereby establishing a selectively conductive path to fan motor 24. If the ambient air temperature exceeds the preselected threshold value, e.g. 60 degrees Fahrenheit, the circuit to fan motor 24 is closed and air will circulate to the thermal control box. If, on the other hand, ambient temperature is less than the threshold temperature, fan motor 24 may or may not be energized, as desired.

When ignition switch 72 is turned off, the circuit through timer switch 76 remains closed, so that if temperature switch 70 is closed fan 24 will continue to run. The fan motor will continue to operate for the preset time period set in the timer or, alternatively, until temperature switch 70 opens as a result of a drop in temperature below the preselected threshold, thereby opening the circuit.

Experiments have shown that in an automotive environment the highest battery temperature extremes occur one to three hours after the vehicle engine has been turned off. Fan 24 will, therefore, circulate air within the casing around the battery during the period after the engine is turned off. The fan does not necessarily cool the battery but is designed to move the air from outside the vehicle, along the internal surfaces of the walls of the battery housing, to remove the penetrating heat before heat energy is transferred to the battery. Under extreme operating conditions, it is possible for the air to remove heat from the battery.

Under extreme cold weather conditions, the ability of a battery to recharge during engine operation is severely limited If the battery can be heated and thus prevented from cooling down quickly, it will accept more charging current during engine operation and, consequently, will be maintained at a higher state of charge. This can be achieved by connecting fan motor 24, through a bypass duct 90, to a metal box 88 mounted on an exhaust manifold 92 of engine 94. Bypass duct 90 is connected to intake duct 26 through a bypass valve 96. Bypass valve 96 can be manually or automatically switched to winter driving conditions, as desired.

A timing circuit and thermostat configuration similar to that described above in connection with high temperature operation can be used to control the fan under cold weather conditions by altering the thermometer such that it closes the circuit when the temperature drops below the preselected threshold temperature Heating the battery for a period of time during and/or after engine operation will hold the battery temperature at a level where it can recharge more effectively during the recharge (engine operation) cycle.

It is also within the contemplation of this invention to provide a compartment through which part of the air from the intake duct 22 is used to cool or heat electrical, electronic, or other temperature sensitive components, either in addition to or in lieu of the battery. A variety of different means may be employed for reducing (at high temperatures) or increasing (at low temperatures) the temperature of the component in accordance with the present invention. For example, a fan, pump, or compressor may be used to induce either positive or negative thermal flux with respect to the component. Alternatively, a speaker or vibrating diaphram may be used to induce fluid flow past the component. Although air is the most convenient fluid medium, it will be appreciated that any fluid, including liquids, may be used.

A typical automotive battery, when fully charged, is capable of delivering approximately fifty eight (58) ampere-hours of current. In accordance with a highly preferred embodiment, a fluid stream is generated by a device, for example a fan, which fan draws approximately 0.1 amps. Theorectically, such a fan could operate continuously for 580 hours (approximately 24 days) before completely depleting the battery current Accordingly, in a vehicle which is typically driven (and hence recharged) every few days, a continuous drain of 0.1 amp would not adversely affect battery performance.

If, on the other hand, increased volummetric flow is desired, a device which consumes more than 0.1 amp may be employed with a concomitant reduction in average battery temperature. The present inventors have determined that satisfactory results may be obtained using devices which operate on between 0.05 and 20 amps.

It should be apparent that there is provided, in accordance with the invention, a battery thermal control box that fully satisfies the aims and advantages set forth above The invention has been described in conjunction with specific embodiments thereof, and it is evident that many alternatives, modifications, and variations will become apparent to those skilled in the art. Accordingly, it is intended to embrace all such alternatives, modifications, and variations as fall within the spirit and broad scope of the appended claims.

The embodiments of the invention in which a exclusive property or privilege is claimed are defined as follows:

1. A method of controlling the time averaged temperature of a temperature sensitive automotive battery in a battery box disposed in an area of an automobile which is subject to wide temperature variations, the method comprising the steps of:
   detecting the on and off states of an engine associated with the automobile, setting a predetermined period of time that a timing circuit will remain closed after the engine has been detected in the off status,
   generating a fluid stream in response to the temperature being below a predetermined temperature and said timing circuit being closed
   detecting the temperature in the vicinity of said battery and
   terminating said stream upon the detection of the temperature in the vicinity of said battery being below said predetermined temperature or the predetermined period of time expiring.

2. The method of claim 1, wherein said predetermined temperature in int he range of about 45-75 degrees Fahrenheit.

3. The method of claim 1 wherein said predetermined temperature is approximately 60 degrees Fahrenheit.

4. The method of claim 1 wherein said predetermined period of time is in the range of about one-half to six hours.

5. The method of claim 1 wherein said predetermined period of time is approximately two to three hours.

6. The method of claim 1 further comprising the step of directing said stream into contact with said battery during at least a portion of the time in which the engine is on.

* * * * *

UNITED STATES PATENT AND TRADEMARK OFFICE
CERTIFICATE OF CORRECTION

PATENT NO. : 5,031,712

DATED : July 16, 1991

INVENTOR(S) : Karolek, Neil C. et al.

It is certified that error appears in the above-identified patent and that said Letters Patent is hereby corrected as shown below:

Column 6, line 40, delete "conJunction" and insert --conjunction--; line 62, add a comma after the word "closed", --,--.

Column 7, line 2, delete "in int he" and insert --is in the--.

Signed and Sealed this

First Day of December, 1992

Attest:

DOUGLAS B. COMER

*Attesting Officer*     *Acting Commissioner of Patents and Trademarks*